United States Patent [19]

Yokoo et al.

[11] Patent Number: 5,146,342
[45] Date of Patent: Sep. 8, 1992

[54] REAR PROJECTION TELEVISION SET WITH LENTICULAR SHEET AND FRESNEL LENS

[75] Inventors: Toru Yokoo; Takashi Nagashima, both of Tokyo, Japan

[73] Assignee: Pioneer Electronic Corporation, Tokyo, Japan

[21] Appl. No.: 625,197

[22] Filed: Dec. 10, 1990

[30] Foreign Application Priority Data

Apr. 20, 1990 [JP] Japan ............................ 2-103138
Apr. 25, 1990 [JP] Japan ............................ 2-107521

[51] Int. Cl.⁵ .......................... H04N 9/31; H04N 5/74
[52] U.S. Cl. ................................ 358/231; 358/237; 353/77; 359/457
[58] Field of Search ............... 358/231, 237, 250, 60, 358/64; 350/128, 126, 123; 353/74, 77, 98

[56] References Cited

U.S. PATENT DOCUMENTS

| | | |
|---|---|---|
| 4,439,027 | 3/1984 | Shioda et al. .................... 358/237 |
| 4,536,056 | 8/1985 | Oguino ............................. 358/231 |
| 4,636,035 | 1/1987 | Clausen et al. ................... 350/126 |
| 4,752,116 | 6/1988 | Sekiguchi ......................... 350/128 |
| 4,810,075 | 3/1989 | Fukuda ............................. 353/77 |

*Primary Examiner*—James J. Groody
*Assistant Examiner*—Glenton B. Burgess

[57] ABSTRACT

A rear projection television set in which a lenticular sheet is superposed to a Fresnel lens to form a light transmissive screen, at least one projection cathode ray tube projects an image onto the Fresnel lens so that the image through the lenticular is viewed by a viewer. A projector lens is mounted to the projection cathode ray tube and has an exit pupil so as to project the image from the projection tube onto the Fresnel lens. The image through the lenticular sheet is viewed at a distance from the lenticular lens, wherein there is a relation $a \times b < 5.5$ where a is distance between the exit pupil of the projector lens 2 and the Fresnel lens 1, and b is a condensing distance for a maximum radius equal to the vertical dimension of the screen.

6 Claims, 6 Drawing Sheets

FIG. 3
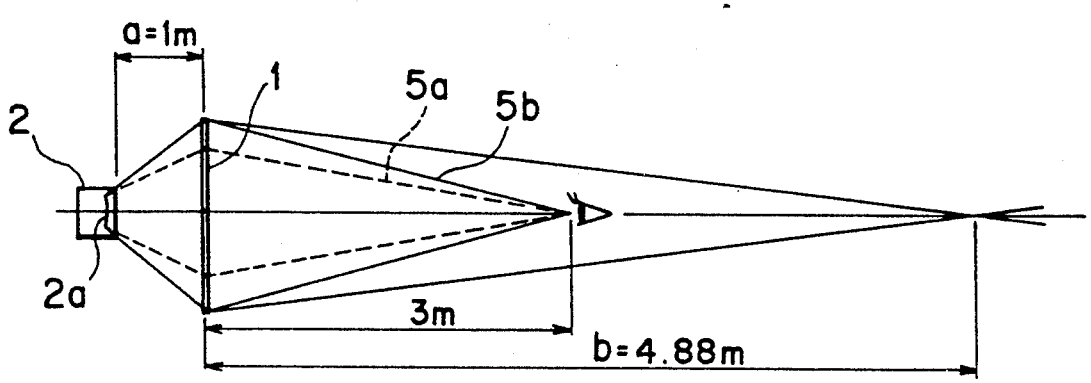
FIG. 4A  FIG. 4B
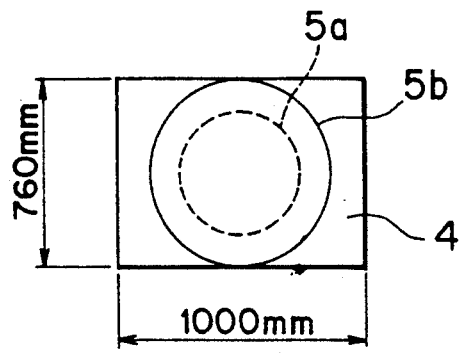
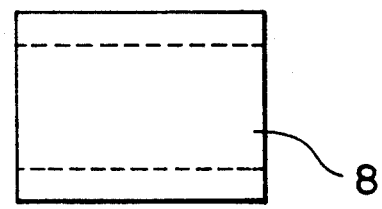
PRIOR ART
FIG. 5
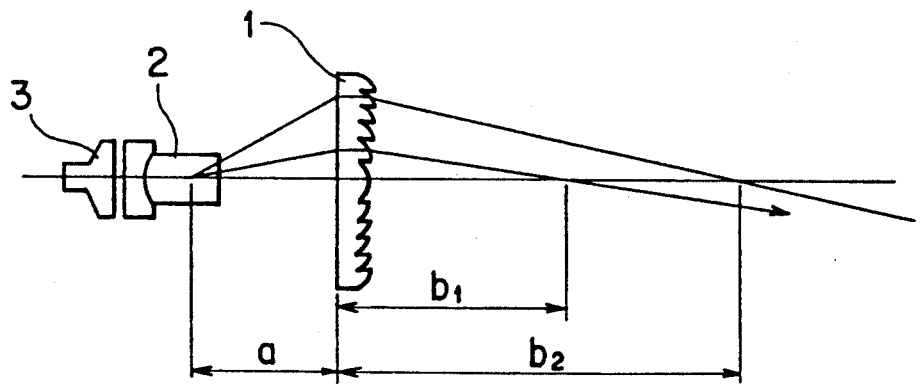

F I G. 14
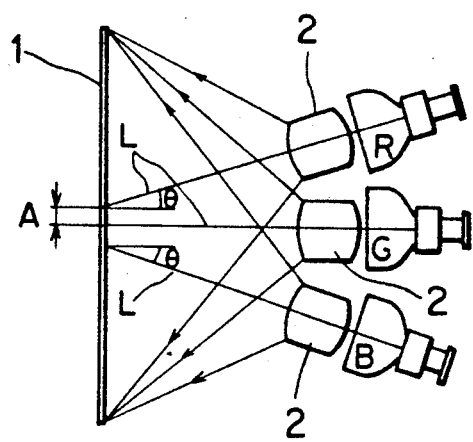
F I G. 16
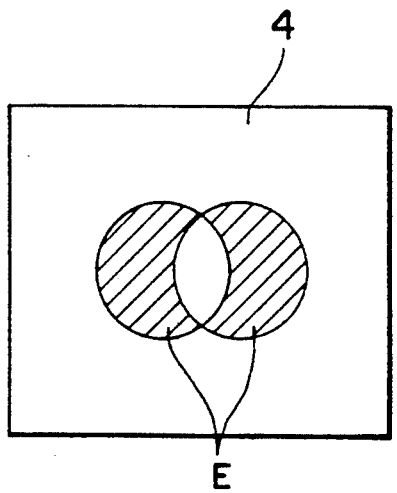
F I G. 15
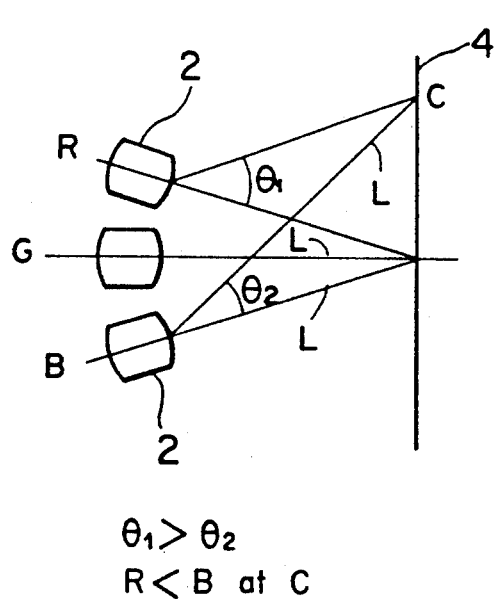
$\theta_1 > \theta_2$
$R < B$ at $C$
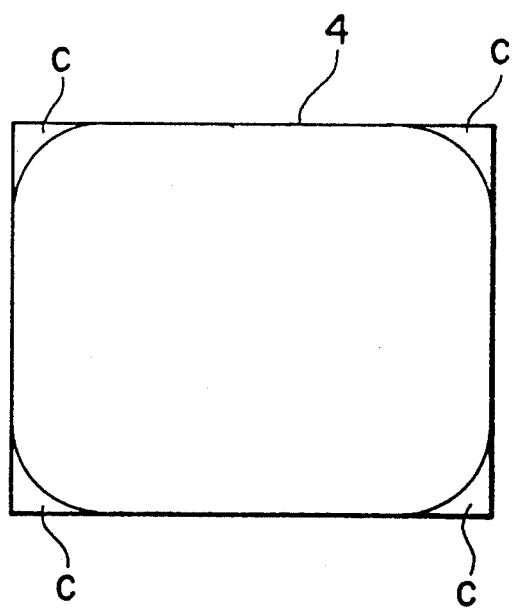

REAR PROJECTION TELEVISION SET WITH LENTICULAR SHEET AND FRESNEL LENS

BACKGROUND OF THE INVENTION

1. Field of the Invention

The present invention relates to a rear projection television set in which an image light is projected from a single- or a three-tube type projection cathode ray tube onto the rear side of a screen and the light passing through the screen is viewed from the front of the screen.

2. Prior Art

In recent years, the improvement both in the brightness and in the resolution on the screen have made possible to view the rear projection television at a distance much closer to the screen than before, about five times the vertical dimension of the screen. Thus, it is required of the rear projection television set that the depth of the cabinet shown at D in FIG. 10 is as thin as possible so that the rear projection television set be space saving. For shorter depths of cabinets, the projection cathode ray tube must be located as close to the screen possible. The projector lens 2 used in the prior art rear projection television set looks substantially truly circular as depicted by $S_o$ when seen on the optical axis of lens and rather oval like a "cat's eyes" as depicted by S when seen at an angle $\theta$ with respect to the optical axis. This phenomenon is referred to as "Vignetting" and the degree of vignetting is referred to vignetting factor. The vignetting causes the less intensity at the peripheral portion of the screen than at middle portion. For example, in the prior art rear projection television having a 40-inch screen (600 millimeters vertically and 800 millimeters horizontally), when the distance a between the pupil of projection lens 2 and the Fresnel lens 1 is 0.8 meters, the condensing distance $b_1$ near the center of the Fresnel lens is relatively short but the distance $b_2$ at a full vertical dimension of the lens is about 20 meters as shown in FIG. 5. The distance b2 is referred to "vertical condensing distance" or simply "condensing distance" in this specification. When this screen is viewed at a point three meters away therefrom, about five times the vertical dimension of screen, the hot spot 5 takes up an area of about 60% of the vertical dimension of screen 4 shortly after the light exits the Fresnel lens as depicted by dotted lines in FIG. 2A, providing that no vignetting occurs. This hog spot 5 is diffused horizontally with the aid of lenticular sheet 6 so as to be viewed as a hot band or bright horizontal belt extending horizontally as depicted by dotted lines in FIG. 28 or by hatched lines in FIG. 10. Conventionally, the hot band has been eliminated by increasing the amount of diffuser in the lenticular sheet, forming the Fresnel lens 1 with a vertical lenticules 7 on the side thereof opposite to projector lens 2 as shown in FIG. 6, or providing the vertical lenticules 7 between the Fresnel lens 1 and lenticular sheet 6 as shown in FIG. 7 so as to improve diffusion of light in the vertical direction. As shown in FIG. 8, improving the vertical diffusion causes the brightness Br to vary as depicted by a curve B with the vertical viewing angle $\Phi$ of the screen 4 which would otherwise vary as depicted by B. The vertical angle of field is referred to a maximum vertical angle with respect to the screen where image on the screen can be viewed normally without noticeable deterioration. As is apparent from the curves A and B, the brightness of screen has been lost significantly. That is, since the heights of viewers eyes are almost always the same, increasing the vertical angle of field does not show significant improvement but the brightness of screen is rigorously deteriorated.

In order to implement thin cabinets for rear projection television sets, the light path between the cathode ray projection tube and the screen should be as short as possible. Therefore, the projection system should be of short focal lengths. In the mean time, as shown in FIG. 9, the amount E of light incident upon the screen at an incident angle of $\Theta$ with respect to a line normal to the screen is smaller than the amount Eo of light incident normal to the screen and is expressed as follows:

$$E = Eo \frac{S}{So} \cos^4 \Theta$$

If the projection system is of short focal lengths, the lights exiting the projector lenses 2 of tubes B and R differ in exiting angles $\Theta_1$ and $\Theta_2$ at corner portions C on the screen 4. This causes the intensity of light R to be small compared to the intensity of light B at the portions C as shown in FIG. 15. Therefore, yellow is faint near the tube R on the screen 4 while blue is faint near the tube B. Conventionally there have been two methods of improving the problem. One is to sufficiently increase the condensing distance of peripheral portions of the Fresnel lens 1, which forms the screen 4, or to cause the light to diffuse near peripheral portions of the Fresnel lens 1 so that the light from the tubes R and B are substantially the same in reflectivity. In this case, however, the amounts of light near the peripheral portions decrease when the screen is viewed at a distance of 2-5 meters away from the screen. Thus the screen is dark at its peripheral portions. Another way of solving the problem is to permit the optical axes of the tubes R and B to aim outwardly at a predetermined distance A of the center of screen as shown in FIG. 14 so that the difference of the exiting angles $\Theta_1$ and $\Theta_2$ is much smaller. The offset allows the exit pupil ($S_o$ in FIG. 9) of the tubes R and B to be oriented downwardly, which decreases the difference in reflectivity of the Fresnel lens 1 which in turn decreases the difference in the amount of light resulted from the aforementioned "cosine law". The second method, however, suffers from the disadvantage that doming is resulted at the hatched portions of the respective hot spots in FIG. 16 when observed from the viewer side of the screen.

SUMMARY OF THE INVENTION

An object of the present invention is to solve, with the brightness of screen unimpaired, a hot band when the cabinet of a prior art projection television set is made thin in depth or when the television is viewed close to the screen. This object is achieved by selecting $a \times b \leq 5.5$ where the condensing distance of Fresnel lens is b meters and a is the distance in meters between the exit pupil of the projector lens and the Fresnel lens.

Another object of the invention is to prevent color shading at peripheral portion when the light path from the projection cathode ray tubes to the screen without loosing portion of light at the peripheral portion of screen and causing color doming to be resulted at left and right sides of the center of screen. The object is achieved by allowing the optical axes of the left and right tubes of three projection tubes to aim at a point of the center of screen and selecting $a \times b \leq 5.5$ where b is the condensing distance in meters of Fresnel lens and a is the distance in meters between the exit pupil of the projector lens and the Fresnel lens.

BRIEF DESCRIPTION OF THE DRAWINGS

Features and other objects of the invention will be more apparent from the detailed description of preferred embodiments with reference to the accompanying drawings in which:

FIG. 3 and FIGS. 4A-4B show a second embodiment of the invention;

FIG. 5 shows an example of a Fresnel lens;

FIG. 14 shows the optical axes of projection cathode ray tubes R and B aimed at a position a distance A from the center of the screen;

FIG. 15 shows the exit angles $\Theta_1$ and $\Theta_2$ of the light from the tubes R and B when the projection system is of short focal lengths; and FIG. 16 shows color doming appearing on the viewer's side of the screen when the optical axes of the tubes R and B are offset by a distance A from the center of the screen.

DETAILED DESCRIPTION OF THE INVENTION

First Embodiment

Figure 1A:
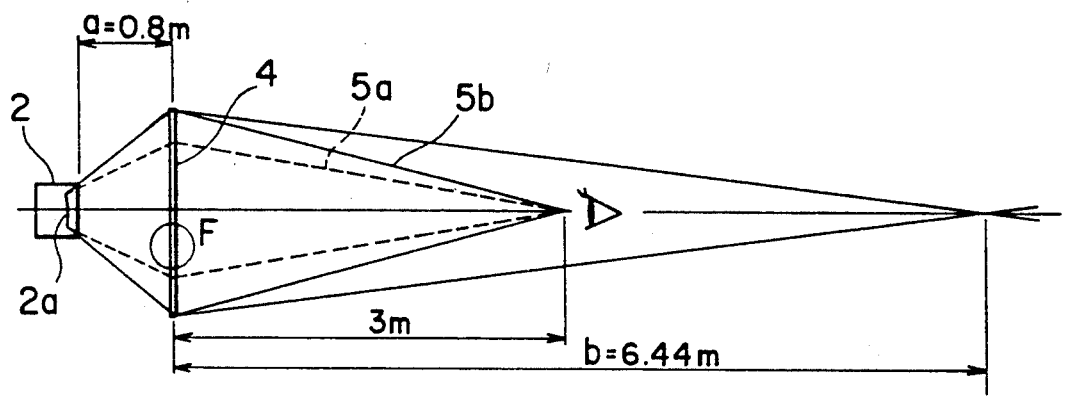
FIGS. 1A-1B and FIGS. 2A-2B show a first embodiment of the invention.
Figure 1B:
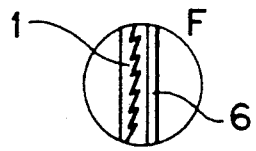

FIGS. 1A and 2 show a first embodiment of the present invention which is applied to a rear projection television set in which a three-tube type projection cathode ray tube is used for projecting an image onto a light transmissive 40-inch screen (vertically 600 millimeters and horizontally 800 millimeters). A Fresnel lens 1 is superposed to a lenticular sheet 6 as shown in FIG. 1B to form a screen 4. The Fresnel lens 1 is made of a material having a refractive index n=1.525. The distance a between the exit pupil 2a of a projector lens 2 and the Fresnel lens 1 is set to 0.8 meters. The condensing distance b of the Fresnel lens 1 is selected to be 6.44 meters. Thus, $$a \times b = 5.15 < 5.5$$

Figure 2A:
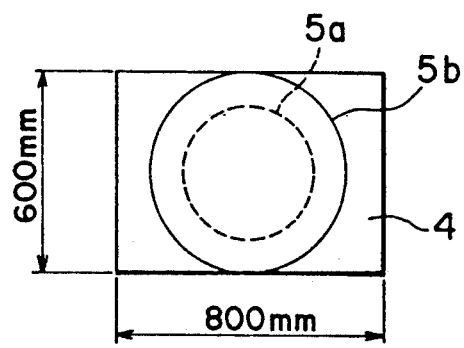

When the screen is viewed at a distance of three meters from the screen 4, the diameter 5b of a hot spot on the lens surface of the Fresnel lens 1 is nearly the same as the vertical dimension of the Fresnel lens 1 as shown in FIG. 2A. The side view of the optical system is depicted by solid lines 5b in FIG. 1A. The hot spot 5b is diffused horizontally by the lenticular sheet so that the entire screen becomes bright and no hot band is observed by the viewers.

Figure 2B:
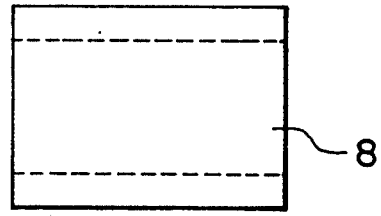
Figure 6:
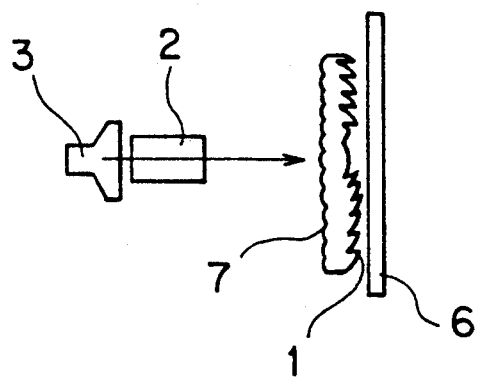
FIG. 6 shows vertical lenticulars provided on the Fresnel lens.
Figure 7:
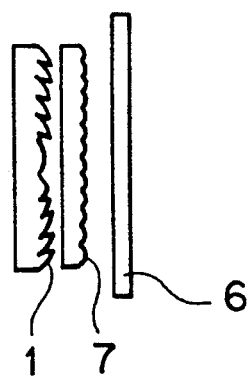
FIG. 7 shows vertical lenticulars provided between the Fresnel lens and the screen.
Figure 8:
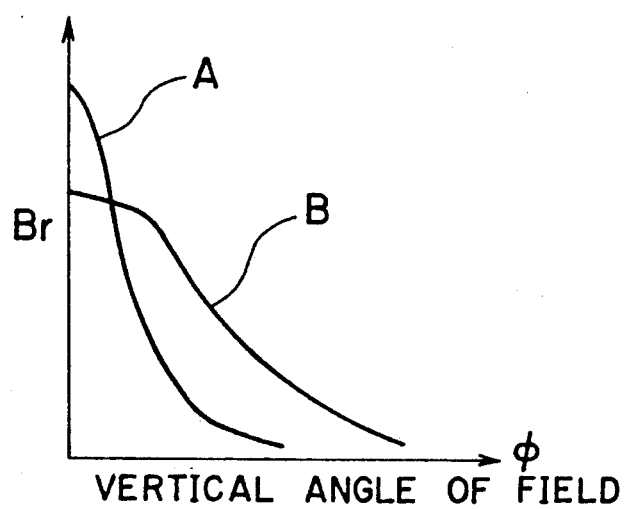
FIG. 8 is a plot of the screen gain (brightness) of the screen against the vertical angle of field when the lenticulars in FIGS. 6 and 7 are incorporated.
Figure 9:
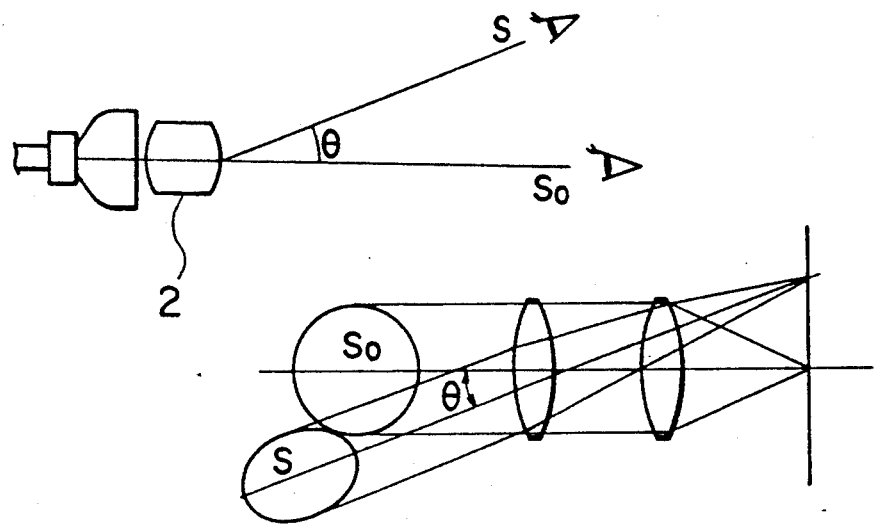
FIG. 9 is an illustrative diagram illustrating the change in brightness with exit angle of the projector lens.
Figure 10:
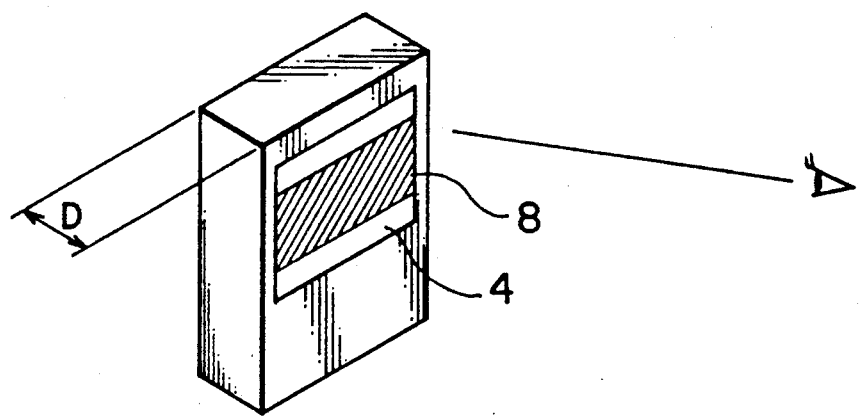
FIG. 10 is an illustrative diagram illustrating the appearance of a prior art rear projection television set and a hot band appearing on the screen.

If a prior art Fresnel lens (condensing distance is 20 meters) is used in the above-mentioned construction, then we have $a \times b = 15.8$, causing a hot spot on the lens surface of Fresnel lens 1 having a diameter of about 60% of the vertical dimension of the screen as depicted by dotted lines in FIGS. 1 and 2A. This hot spot is viewed as a hot band which is an area bounded by the dotted lines as shown in FIG. 2B when the screen is viewed by the viewers three meters away therefrom.

Second Embodiment

FIGS. 3 and 4 show a second embodiment of the present invention which is applied to a rear projection television set where a three-tube type projection cathode ray tube is used for projecting an image onto a light transmissive 50-inch screen 4 (vertically 760 millimeters and horizontally 1000 millimeters). A Fresnel lens 1 is superposed to a lenticular sheet 6 as shown in FIG. 1B to form a screen 4. The Fresnel lens 1 is made of a material having a refractive index n=1.525. The distance a between the exit pupil 2a of a projector lens 2 and the Fresnel lens 1 is set to 1.0 meters. The condensing distance b of the Fresnel lens 1 is selected to be 4.88 meters. Thus, we have $$a \times b = 4.8 < 5.5$$

When the screen 4 is viewed by the viewers at a distance of three meters from the screen 4, the diameter of a hot spot on the lens surface of Fresnel lens 1 is nearly the same as the vertical dimension of the Fresnel lens 1 as depicted by 5b in FIG. 4A. The side view of the optical system is depicted by solid lines 5b in FIG. 3. The hot spot 5b is diffused horizontally by the lenticular sheet so that the entire screen becomes bright and no hot band is recognized by the viewers.

If a prior art Fresnel lens (condensing distance is 6.8 meters) is used in the above-mentioned construction, then we have $a \times b = 6.8 > 5.5$, causing a hot spot on the Fresnel lens 1 having a diameter of about 60% of the vertical dimension of the screen as depicted by dotted lines in FIGS. 4A. This hot spot is viewed as a hot band, which is an area bounded by the dotted lines as shown in FIG. 4B when the screen is viewed by the viewers three meters away therefrom.

While the first and second embodiment shave been described with respect to a rear projection television having three projection cathode ray tubes, the invention may also be applied to those having a single tub or a liquid crystal screen.

Third Embodiment

Figure 11:
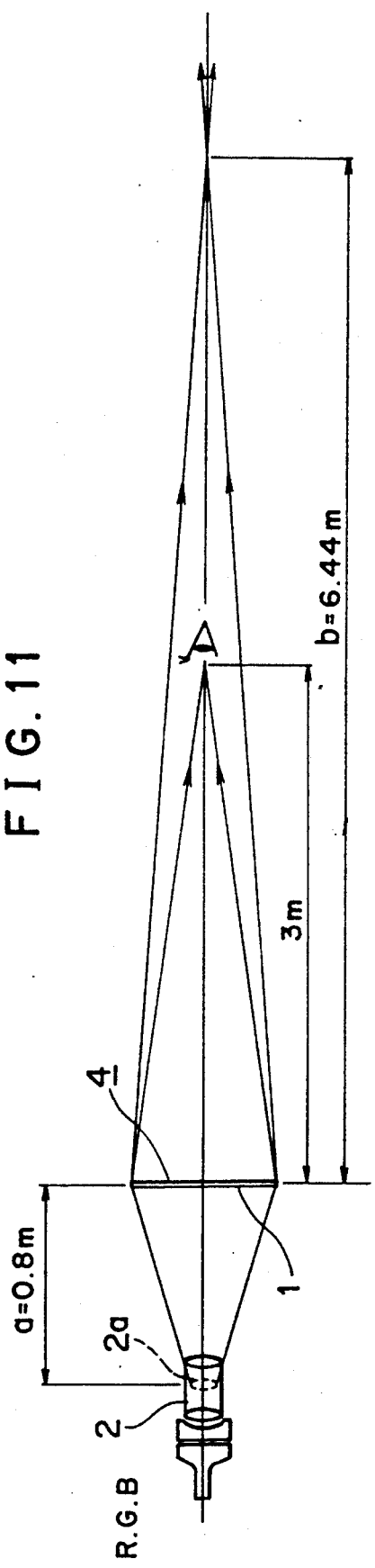
FIG. 11 shows a third embodiment of the invention.

FIG. 11 shows a third embodiment of the present invention which is applied to a rear projection television set where a three-tube type projection cathode ray tube is used for projecting an image onto a light transmissive 40-inch screen (vertically 600 millimeters and horizontally 800 millimeters). A screen 4 is formed of a Fresnel lens 1 superposed to a lenticular sheet 6 as shown in FIG. 1B. The distance a between the exit pupil 2a of a projector lens 2 and the Fresnel lens 1 is set to 0.8 meters. The optical axes of the projection cathode ray tubes R and B on two sides are aligned to aim at a point of A=20 millimeters from the center of screen. The exit pupil of a projection lens 2 is located at a power lens and the radius of the exit pupil is about 40 millimeters. The three tubes R, G, and B are located so that the distances between the screen 4 and the exit pupils of the projection lenses are the same. In the third embodiment, the condensing distance of Fresnel lens for the green light emitted from the tube G is regarded as the condensing distance of the Fresnel lens 1. FIG. 1 shows the light path when the screen is viewed three meters from the screen 4 and the condensing distance b of the Fresnel lens 1 is selected to be 6.44 meters. Thus, the distance a and b are related as follows:

$$a \times b = 0.8 \times 6.44 = 5.14 < 5.5$$

Figure 12:
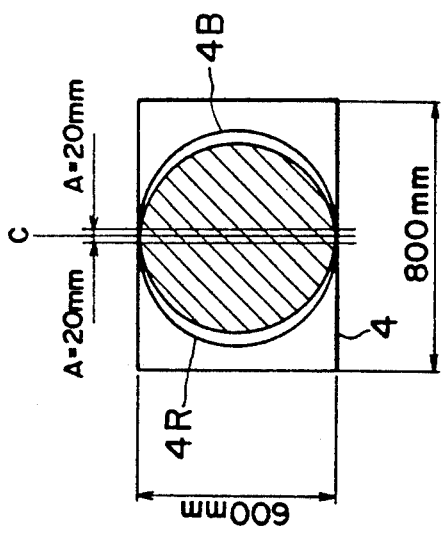
FIG. 12 shows the size of an image on the viewer's side of screen when the image is projected by the projection tube onto the screen in the third embodiment.

The diameter of a hot spot on the Fresnel lens 1 is as large as the vertical dimension of the Fresnel lens 1 as shown in FIG. 12. At this time, since the red light R and blue light B are overlapped with each other over a large area, portion in which the two lights are not overlapped each other is not recognized seriously.

If a prior art Fresnel lens (condensing distance usually ranges from 8 to 20 meters) having a condensing distance of 12 meters is used in the third embodiment, then $$\begin{aligned} a \times b &= 0.8 \times 12.0 \\ &= 9.6 > 5.5 \end{aligned}$$

Figure 13:
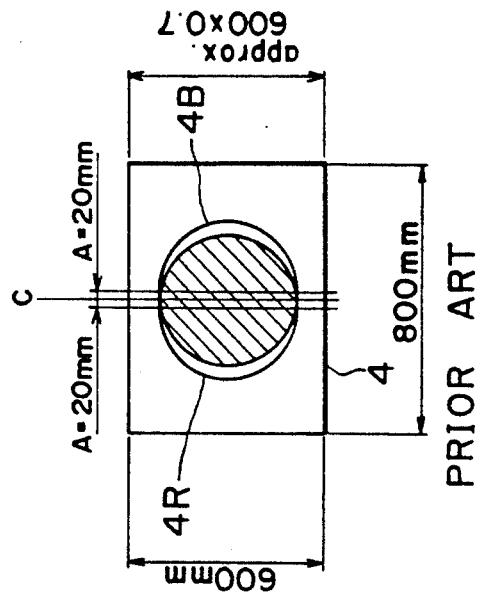
FIG. 13 shows the size of an image on the viewer's side of screen when the image is projected by the projection tube onto the screen if a conventional Fresnel lens having a long condensing distance is used in the construction in FIG. 11.

, causing hot spots 4R and 4B whose diameters are about 70% of the vertical dimension of the screen. The portion where the two lights are overlapped is small as compared to the third embodiment, accordingly the portion where the two lights are not overlapped is noticeable. FIG. 13 shows the size of an image on the viewer's side of screen when it is projected by the projection tube onto the screen if a conventional Fresnel lens having a long condensing distance is used in the construction in FIG. 11.

We claim:

1. A rear projection television set comprising:
   a light transmissive screen 4 formed of a lenticular sheet superposed to a Fresnel lens;
   at least one projector for projecting an image onto said Fresnel lens so that the image through the lenticular is viewed by a viewer; and
   a projector lens 2 mounted to said projector, said projector lens having an exit pupil so as to project the image from said projector onto the Fresnel lens; wherein said image through the lenticular sheet is viewed at a distance from the lenticular lens, wherein there is a relation $a \times b < 5.5$ where a is a distance between said exit pupil of the projector lens 2 and said Fresnel lens 1, and b is a condensing distance for a maximum radius equal to the vertical dimension of said screen.

2. The rear projection television set of claim 1, wherein the Fresnel lens has a refractive index of approximately 1.525.

3. The rear projection television set of claim 1, wherein the distance a is approximately 0.8 m and the distance b is approximately 6.44 m.

4. The rear projection television set of claim 1, wherein the distance a is approximately 1.0 m and the distance b is approximately 4.88 m.

5. The rear projection television set of claim 1, wherein said at least one projector includes three cathode ray tubes, the optical axes of two of said tubes being aligned to respectively aim at points approximately 20 mm from the center of said screen on opposite sides thereof.

6. The rear projection television set of claim 5, wherein said two tubes emit red and blue light and the other tube emits green light.

* * * * *

UNITED STATES PATENT AND TRADEMARK OFFICE
CERTIFICATE OF CORRECTION

PATENT NO. : 5,146,342
DATED : September 8, 1992
INVENTOR(S) : Toru Yokoo et al.

It is certified that error appears in the above-identified patent and that said Letters Patent is hereby corrected as shown below:

```
Column 1, line 48, delete "hog", insert --hot--;

line 52, delete "28", insert --2B--.

Column 2, line 35, delete "Another", insert --Other--.

line 42, delete "downwardly", insert --outwardly--.

Column 4, line 53, delete "shave", insert --have--;

line 56, delete "tub", insert --tube--.

Column 5, line 30, delete "120", insert --12.0--.
```

Signed and Sealed this

Twenty-first Day of December, 1993

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,146,342

DATED : September 8, 1992

INVENTOR(S) : Toru Yokoo et al. and Takashi Nagashima

It is certified that error appears in the above-identified patent and that said Letters Patent is hereby corrected as shown below:

Column 6, line 19, delete "radius", and insert --diameter--.

Signed and Sealed this

Twenty-ninth Day of March, 1994

Attest:

BRUCE LEHMAN

Attesting Officer     Commissioner of Patents and Trademarks